Feb. 1, 1966   D. P. SHELDON   3,232,230
TRAVELING ROLLER CARRIAGE MEANS IN BED AND CYLINDER PRINTERS
Filed Aug. 23, 1962                                         6 Sheets-Sheet 1
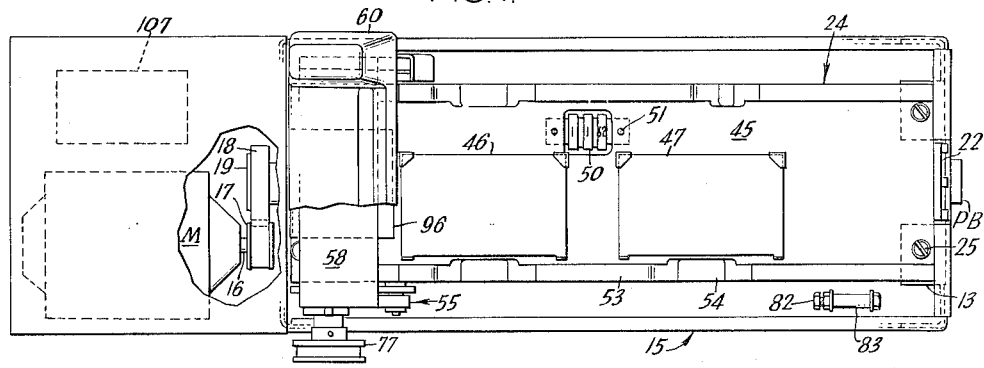
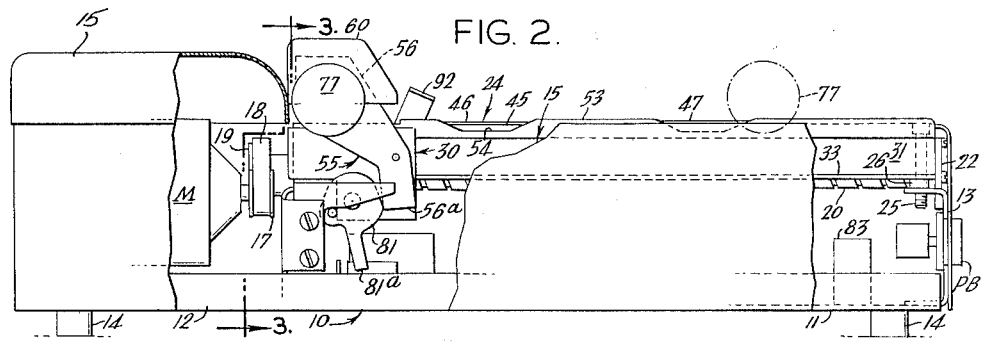
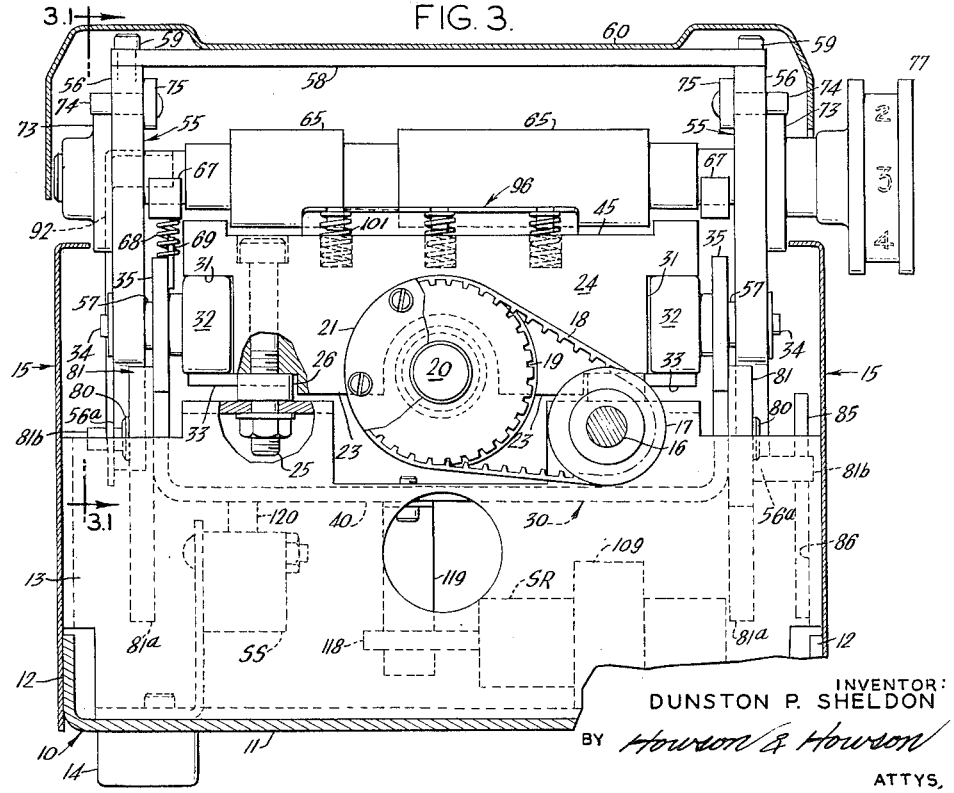
INVENTOR:
DUNSTON P. SHELDON
BY Howson & Howson
ATTYS,

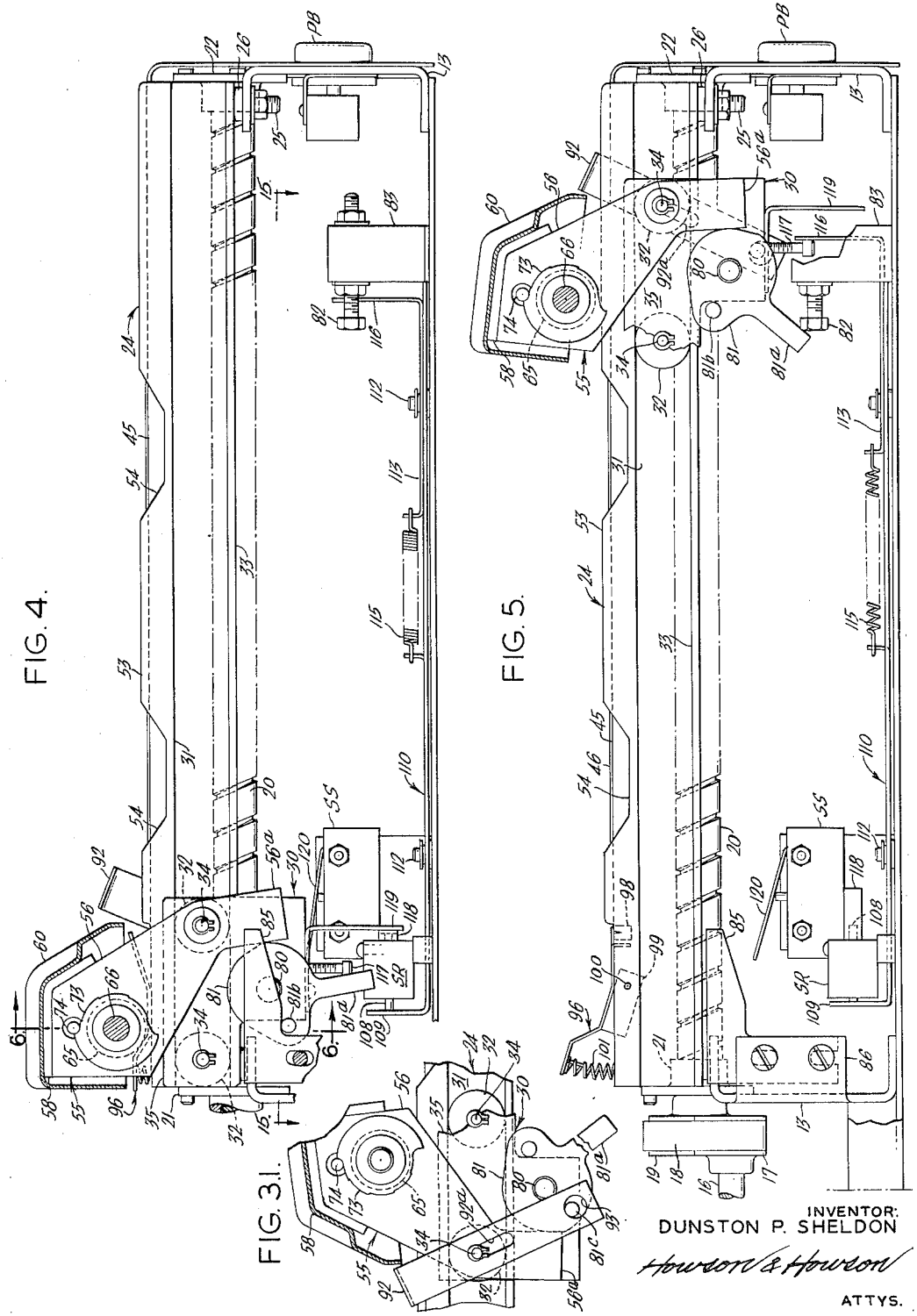

Feb. 1, 1966    D. P. SHELDON    3,232,230
TRAVELING ROLLER CARRIAGE MEANS IN BED AND CYLINDER PRINTERS
Filed Aug. 23, 1962    6 Sheets-Sheet 3

INVENTOR:
DUNSTON P. SHELDON
BY Howson & Howson
ATTYS.

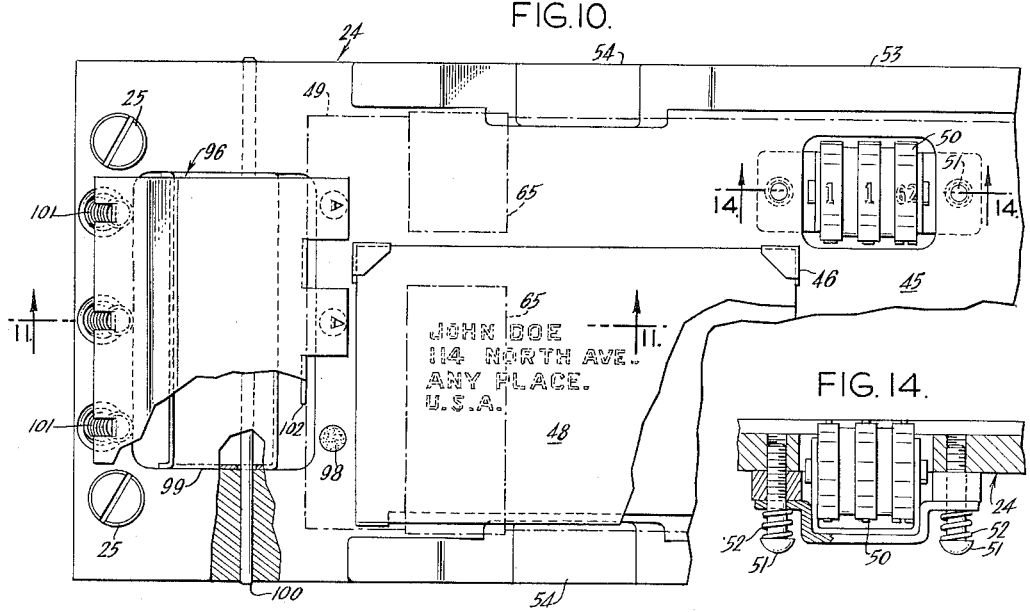
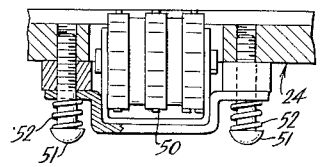
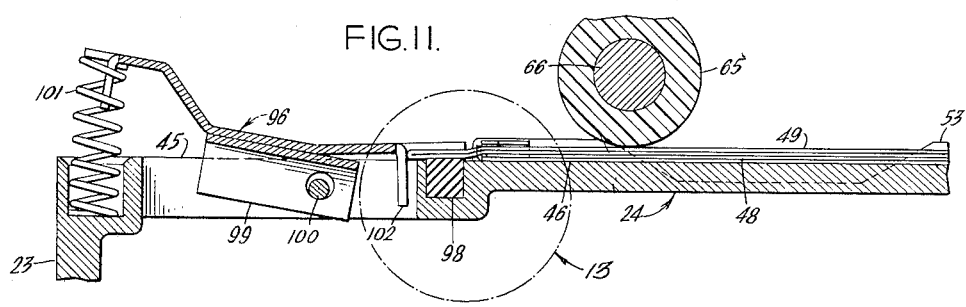
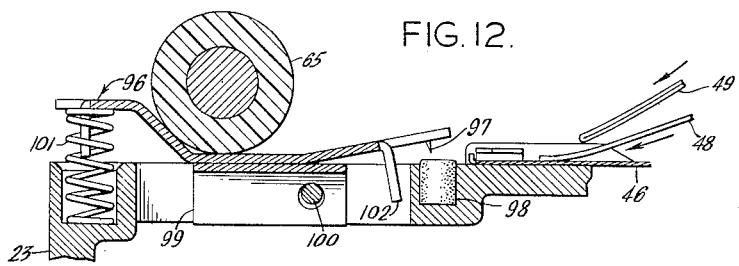
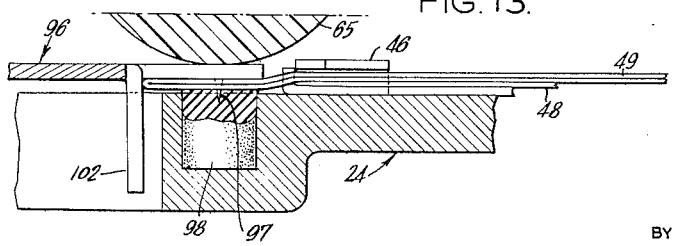

Feb. 1, 1966  D. P. SHELDON  3,232,230
TRAVELING ROLLER CARRIAGE MEANS IN BED AND CYLINDER PRINTERS
Filed Aug. 23, 1962  6 Sheets-Sheet 5
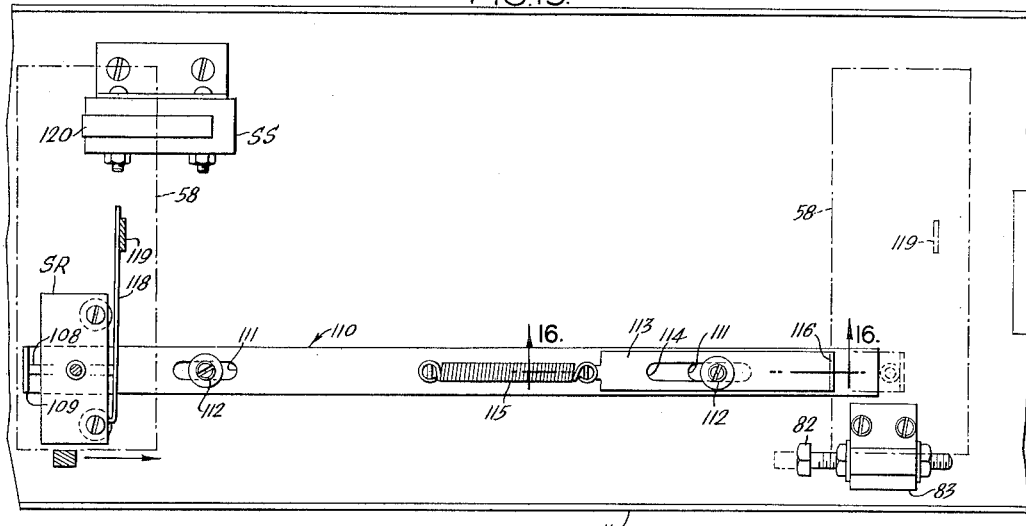
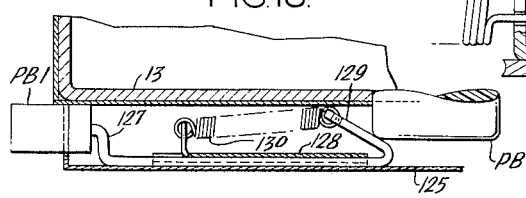
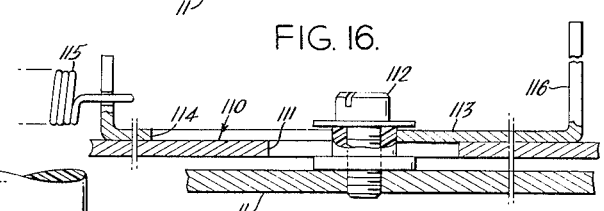
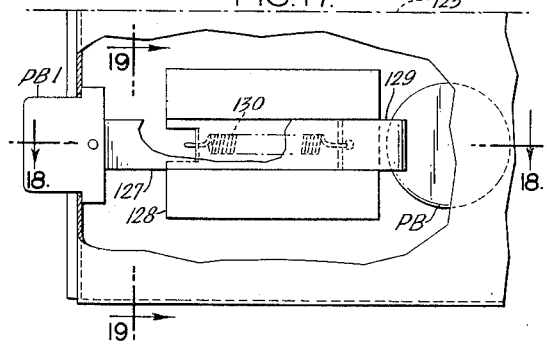
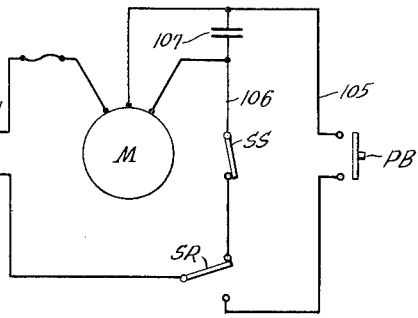
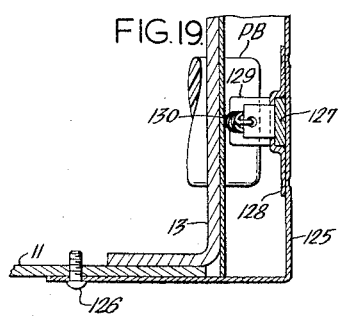
INVENTOR:
DUNSTON P. SHELDON
BY Howson & Howson
ATTYS.

Feb. 1, 1966　　　　D. P. SHELDON　　　　3,232,230
TRAVELING ROLLER CARRIAGE MEANS IN BED AND CYLINDER PRINTERS
Filed Aug. 23, 1962　　　　　　　　　　　　　　6 Sheets-Sheet 6

INVENTOR:
DUNSTON P. SHELDON
BY Howson & Howson
ATTYS.

United States Patent Office 3,232,230
Patented Feb. 1, 1966

3,232,230
TRAVELING ROLLER CARRIAGE MEANS IN BED AND CYLINDER PRINTERS
Dunston P. Sheldon, Daylesford, Pa., assignor, by mesne assignments, to Dashew Business Machines, Inc., Los Angeles, Calif., a corporation of Delaware
Filed Aug. 23, 1962, Ser. No. 219,014
5 Claims. (Cl. 101—269)

This invention relates to an imprinting machine of the type in which a roll moves over a sheet or pad located upon printing elements carried on a backing support or platen and has for an object the provision of improvements in this art.

The pressure roll or rolls of imprinting machines of this type are mounted on a carriage which makes a complete reciprocation or successive out-and-back strokes for each imprinting operation. In order to avoid overprinting or blurring of the printed impression it is customary to have an active or printing stroke, usually the outstroke, and an inactive, idle, or non-printing stroke, usually the return stroke. In order to provide for this the roll and platen are separated spatially on the idle or inactive stroke. The present invention provides improved means for fixing the roll position and for shifting the roll position between strokes or during strokes.

The invention also provides convenient means for shifting the roll position manually, as for relieving a jammed condition.

The invention provides means for conveniently maintaining and adjusting the roll mounting shaft for parallelism with the printing elements so that the printing will be distinct completely across the width of the roll imprinting path.

The invention also provides a fixed gap relationship between the roll and the printing elements, with adjustment for different thicknesses of material, thus avoiding the undependable operation of a spring biased roll.

In the type of machine in which the carriage is driven or reciprocated by a spiral screw operating in a nut on the carriage there has been considerable binding and friction and dissipation of power which required a large motor. The present invention avoids this by providing a mounting for the nut which permits free lateral and twisting movements to accommodate local lateral movements of the screw shaft along its length, the arrangement being such as to maintain unimpaired the axial drive of the carriage.

The invention also provides modified carriage drive means other than by a spiral screw and thereby avoids the existence of the this problem in the use of a screw drive shaft.

The invention provides safety means for halting the movement of the carriage at any point on the outstroke by releasing a manual starting control, the carriage moving continuously free from this control on the return stroke when the roll is held in raised position.

The invention also provides improved means for holding a sheet or pad to assure that it will remain accurately in the desired position during printing, the means provided including elements which engage transverse portions of the sheet (engaging all sheets when a pack is present, as is usual) to avoid the uncertain action of the frictional grip of springs pressing on the surface of the top sheet only.

The invention also provides improved means for holding a card carrying printing elements to permit latitude in the location of the card.

The invention also provides improved means for reversing the direction of drive to avoid the load reponsive reversing arrangement previously used with a screw shaft carriage drive.

The objects, features and advantages of the invention will be apparent from the following description of an illustrative embodiment and some variants of the invention, reference being made to the accompanying drawings wherein:

FIG. 1 is a top plan view of a power operated imprinting machine embodying the invention, part of the outer casing being removed;

FIG. 2 is a side elevation of the machine shown in FIG. 1;

FIG. 3 is an enlarged transverse vertical section taken on the line 3—3 of FIG. 2;

Figure 6:
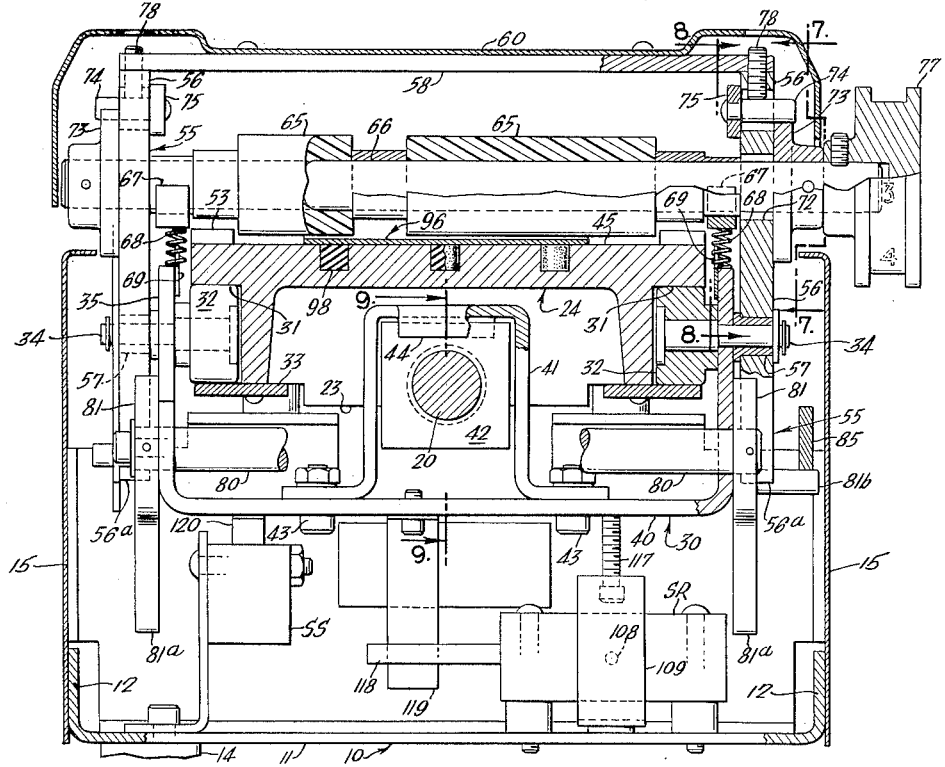
Figure 7:
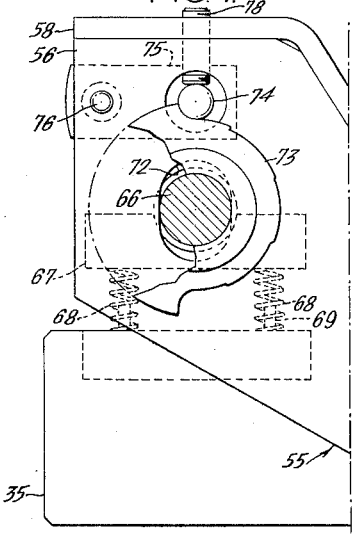
Figure 8:
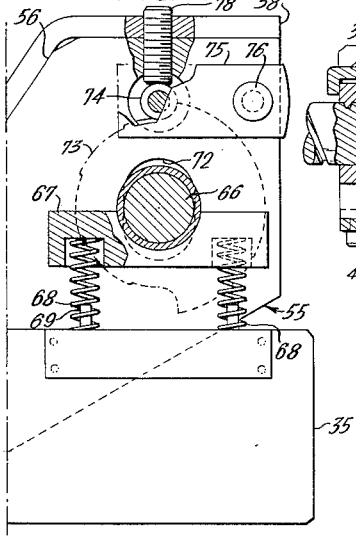
Figure 9:
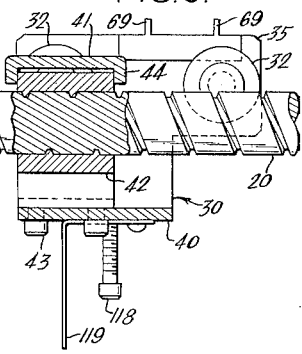
Figure 21:
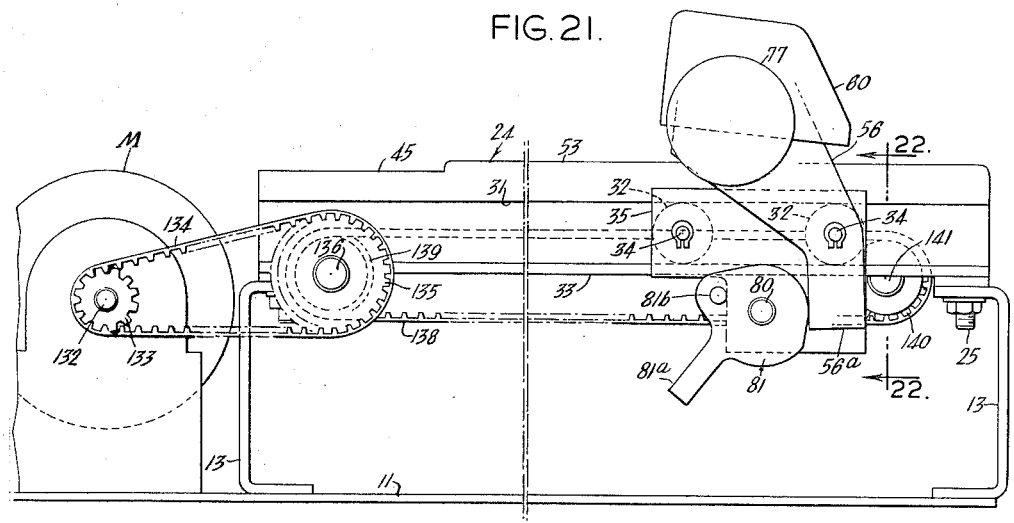
Figure 22:
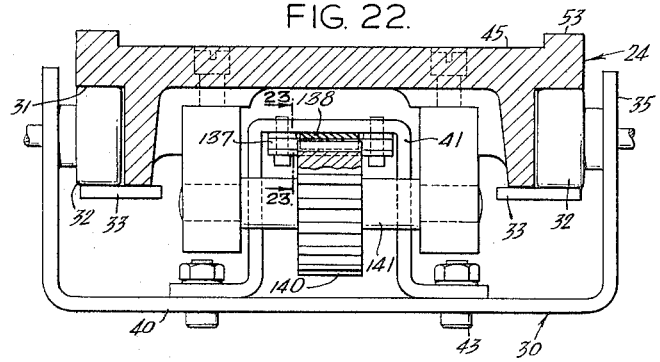
Figure 23:
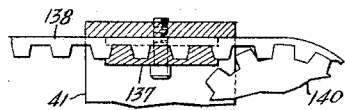

FIG. 3.1 is a partial side elevation taken on the line 3.1—3.1 of FIG. 3;

FIG. 4 is an enlarged partial side elevation taken inside the outer casing;

FIG. 5 is a view like FIG. 4 but showing parts in a different position;

FIG. 6 is an enlarged transverse vertical section taken on the line 6—6 of FIG. 4;

FIG. 7 is a partial enlarged longitudinal vertical section taken on the line 7—7 of FIG. 6;

FIG. 8 is a partial enlarged longitudinal vertical section taken on the line 8—8 of FIG. 6;

FIG. 9 is a partial longitudinal vertical section taken on the line 9—9 of FIG. 6;

FIG. 10 is an enlarged partial plan view of the sheet and card holding end of the machine, the imprinting pressure roll and carriage being moved away;

FIG. 11 is an enlarged vertical longitudinal section taken on the line 11—11 of FIG. 10, the pressure roll being shown in imprinting position;

FIG. 12 is a view like FIG. 11 but showing the roll at the rear end of its stroke;

FIG. 13 is further enlarged vertical longitudinal section showing the roll in position to secure a sheet or pad in position, the view being taken in the circle 13 of FIG. 11;

FIG. 14 is a longitudinal vertical section of a detail taken on the line 14—14 of FIG. 10;

FIG. 15 is an enlarged plan view taken on the line 15—15 of FIG. 4;

FIG. 16 is an enlarged partial longitudinal vertical section taken on the line 16—16 of FIG. 15;

FIG. 17 is a right end view, with part of the enclosure broken away, of a modified pushbutton control mechanism;

FIG. 18 is a horizontal section taken on the line 18—18 of FIG. 17;

FIG. 19 is a vertical section taken on the line 19—19 of FIG. 17;

FIG. 20 is a wiring diagram;

FIG. 21 is a side elevation of a modified carriage drive arrangement;

FIG. 22 is a transverse vertical section taken on the line 22—22 of FIG. 21;

FIG. 23 is a detail section taken on the line 23—23 of FIG. 22; and

Figure 24:
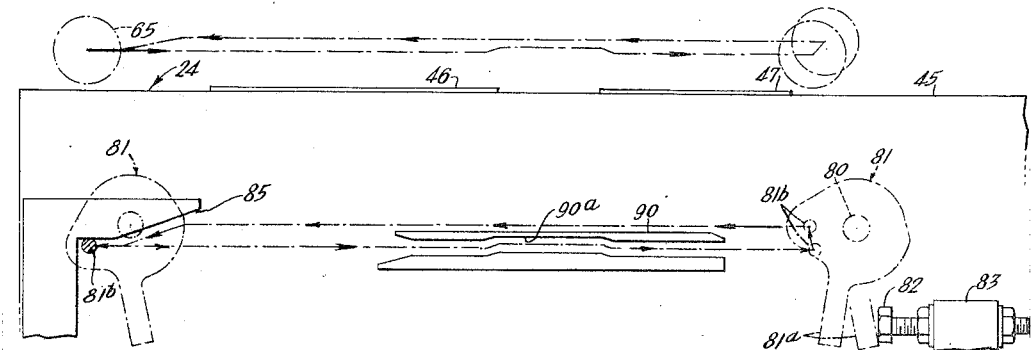

FIG. 24 is a diagrammatic side elevation of an intermediate roll control mechanism.

The imprinting device illustrated comprises a frame 10 having a base plate 11 with turned up rigidifying side flanges 12 and longitudinally spaced transverse facing channel shaped members 13 secured to the base plate in any convenient manner, as by welding. The frame rests on feet or pads 14 secured to the base in any usual manner, as by recessed head screws. The mechanism is driven by a reversible motor M secured on the base beyond the frame member 13 at that end. Cover means are provided for the motor and other parts where wanted but the cover is largely omitted for clarity here. Where it is shown it is indicated generally by the numeral 15.

The motor M through its shaft 16 (FIG. 3), a pulley 17 thereon, a belt 18, and a pulley 19 drives a spiral carriage-traversing screw shaft 20. The shaft 20 is mounted in bearings 21, 22 at its ends.

The bearings 21, 22 are carried by transverse depending end flanges 23 carried by a rigid platen or bed frame 24 secured to the top flanges of the frame end members 13, as by bolts 25, spacers 26 being disposed between parts.

The bed frame 24 supports a reciprocatory roll carriage 30 for longitudinal movement thereon, the bed frame on the sides having wheel track channels or grooves 31 for wheels or rollers 32 of the carriage. For convenience of assembly each wheel track channel is provided with an attachable plate 33 which closes the lower side. The wheels 32 are turnably mounted on shafts 34 carried by side plate elements 35 of the carriage 30, the carriage having a lower transverse element 40 carrying a cage frame 41 mounting a nut 42 threaded on the screw shaft 20 for moving the carriage back and forth. The cage frame 41 is secured to the transverse element 40, as by bolts 43.

The nut 42 is loosely carried by the cage frame 41, as by downturned flanges 44 (FIGS. 6 and 9) so it can move up or down or sidewise or have a slight twisting movement to follow the movements of the screw shaft 20 without binding, at the same time moving the carriage positively and without longitudinal play with the screw shaft.

The top of the platen bed 45 of the frame 24 is flat or plane and carries thereon card holding plates 46, 47 which are secured, as by adhesive, at any location where they are wanted. One card, such as a customer's embossed credit card 48 is shown in FIG. 12 as being inserted in the plate holder 46. There a sales ticket pad 49 is shown as it is placed on top of the card. The other card may be the dealer's and could be a permanent fixture. A dating stamp 50 (FIGS. 10 and 14) is resiliently held for depressive movement by mounting screws 51 and springs 52. The platen frame has raised sides 53 provided with recesses 54 from the top at proper places to aid in the insertion of cards and ticket pads.

A rigid swingable roll frame 55 is mounted on the carriage 30, the roll frame here including side frame plates 56 (FIG. 6) turnably mounted on bushings 57 carried by the shafts 34 of the front rollers 32 of the carriage. The side plates 56 are rigidly united by an angular top transverse beam 58 secured to the plates by cap screws 59. A cover 60 is secured to the beam 58, as by suitable screws.

As shown in FIGS. 6-8, an imprinting roll 65, as of a relatively dense slightly yieldable material, such as "Nylon," is mounted on a roll shaft 66. Here the roll is divided into two parts, one for the cards and one for the dater; but it may be a single part.

It is arranged that the roll will be positively held down but will be resiliently lifted. As show, the roll shaft 66 rests in bearing supports 67 carried on springs 68 of the carriage, fixed pins 69 being provided to hold the springs in place. The shaft 66 is disposed in vertically elongated slots 72 of the side plates 56 and on the outer sides of the plates has secured thereto hold-down and space-adjusting cam disks 73 which at their upper edges engage stop detent pins 74 carried on swingable arms 75 mounted on pivot pins 76 on the plates 56.

As shown in FIGS. 6-8, the shaft 66 and the cam plates 73 are turned by a hand knob 77 secured to one end of the shaft, the knob being marked around its perimeter for different thicknesses or number of sheets in a ticket pad.

Means are provided for making initial adjustments and for adjusting the roll shaft to bring it into parallelism with the platen bed or table surface, the means here shown comprising lockable set screws 78 threaded in the top of the roll frame which engage the top sides of the cam stop detent pins 74.

Means are provided for shifting the impression rolls up and down as desired. Usually they will be swung down at the beginning of the outstroke and will be held up on the backstroke to avoid overprinting and smudging. It may also be desirable to lift the rolls as they reach the raised edges of the plates or cards to avoid pushing the paper up or pulling it down at the edges. This is important when there are several thicknesses of paper and carbon paper in a ticket pad.

As shown, a transverse cam shaft 80 is turnably mounted in the side plate elements 35 of the carriage and on each outer side thereof the shaft carries a throw-out cam 81 which has peripheral cam surfaces engaging the depending cam arms 56a of the roll frame side plates 56.

As shown in FIG. 5, the cams 81 are provided with projecting operating arms 81a, one of which on one side at the outer end of the outstroke engages the head of an adjustable cam shifting abutment bolt 82 mounted in a bracket 83 secured to the bottom plate of the main frame.

The actuated cam 81 on one side is also provided with a lateral actuating pin 81b which, at the end of the return stroke, engages the inclined surfaces of a fixed cam 85 secured to a vertical side flange 86 of the transverse member 13.

The means provided for raising the rolls as desired on the outstroke are shown for one plate by way of example in FIG. 24. Here the pins 81b travel in the fixed closed cam groove of a fixed cam bar 90 on the outstroke and a raised part 90a raises and lowers the pin (and roll) as required. On the return stroke the pin 81a is located at a higher level and passes over the top of the cam bar 90 without any interaction therewith.

Means are provided for raising the roll at any time, as for relieving a jammed condition. The means here shown comprises a flat pull rod 92 on one side having a guide slot 92a for vertical movement on a roll shaft 34 and having an oversize hole 93 engaging a pin 81c on a cam 81 to pull it up or push it down when necessary.

Means are provided for holding ticket pads down on the cards so there is no slip during printing. As shown in FIG. 6 and FIGS. 10-13, a clamp plate 96 has piercing pins 97 which pass through the pad sheets and impale them on fixed yieldable elastic pads 98, as of rubber.

The clamp plate has side bearing plates 99 loosely carried by a transverse rod 100 and springs 101 urge the plate 96 upward at the rear end. The impression roll provides actuation, as clearly shown in FIGS. 11-13. FIG. 12 shows the roll in rear position holding the plate up at the front end so the ticket pad 49 can be inserted beneath the piercing pins 97. The pad edge stops against downturned flange elements 102. FIG. 13 shows the clamped position, the roll forcing the piercing pins down. FIG. 11 shows the roll in printing position with the clamp held down by the springs. The loose motion on the rod gives the piercing pins more clearance for inserting the ticket pad.

Means are provided for actuating and controlling the operations of the carriage. A control circuit is shown in FIG. 20. Power is supplied by lines L1, L2 to the motor M and the motor is controlled by alternate circuit lines 105, 106 between the motor and the power line L2. A pushbutton switch PB in line 105 holds power current on the motor on the outstroke of the carriage, the pushbutton lifting to break the circuit if the hand is taken off.

A reversing switch SR is provided from L2 to the lines 105, 106 selectively. On the outstroke the switch SR is connected with line 105 which has the pushbutton in circuit but when the carriage reaches the outer end of its stroke the switch SR shifts L2 to line 106 to reverse the motor. The motor is of the type which reverses instantly and as quickly reverses the travel of the carriage, but a capacitor 107 is placed between the lines 105, 106 to damp out the effects of reversal.

At the other or home end of the carriage stroke the switch SR is again shifted to connect L2 to line 105 having the pushbutton PB.

At about the time that reversing switch SR is actuated upon the return of the carriage a stop switch SS is actuated to cut off current from line 106, the motor allowing the carriage to coast to a predetermined stop position.

The reversing switch SR is located at the home end of the carriage travel and includes an operating pin 108 which will remain at either end of its stroke after operation. Behind it there is an upstanding arm 109 of a slide operating member or rod 110 which has slots 111 for headed guide screws 112 secured to the base. A secondary slide member or rod 113 at the outer end of the rod 110 has a slot 114 embracing one of the guide screws 112 and is connected to the rod 110 by a tension spring 115. An upstanding arm 116 of the secondary rod 113 is adapted to be engaged by the end of a depending pin 117 (FIG. 5) (here formed as a headed pin adapted to be screwed into position) when the carriage is at the end of its outstroke for reversing the switch.

On its other side the switch SR is provided with an actuating arm or spring 118 and the carriage is provided with a depending actuating arm 119 secured therebeneath which engages the arm 118 to shift the switch when the carriage returns to its home position.

The stop switch SS is opened when the carriage returns to its home position, as by engagement of its operator 120 by an operating element of the carriage, here the transverse element 40. The switch closes by spring pressure when the operating element moves away on the outstroke of the carriage, leaving the switch in a closed position ready for the next stop.

There are times when the pushbutton PB is not accessible, as when that end of the machine is located adjacent a wall, as is often the case. FIGS. 17–19 show an attachment for operating the pushbutton by an adapter in such cases. Here a frame or casing 125 is secured to the base of the main frame, as by screws 126, and a slide 127 carried by a guide 128 has a tapered cam member 129 which engages the pushbutton and, when pushed in by a secondary pushbutton PB1 pushes in the primary pushbutton PB. A spring 130 returns the slide 127 to initial position when the pushbutton PB1 is released.

A modified form of carriage operating means is shown in FIGS. 21–23. Here the shaft 132 of motor M is provided with a notched pulley 133 which drives a timing belt 134 which, through a notched pulley 135 on a transverse shaft 136 drives the shaft in forward or reverse direction in accordance with the direction of rotation of the motor. The carriage is secured, as by a clamp 137, to the upper span of a timing belt 138 which at one end is driven by a notched pulley 139 on the shaft 136 and at its outer end passes over a notched idler pulley 140 carried on a shaft 141. Since the belt 139 is flexible there is no binding effect at all relative to guided carriage movements.

The operation will be clear from the foregoing description. With the dater set and with a dealer's card in the plate holder 47, the operator places a customer's card in the plate holder 46. Making sure that the roll shaft is adjusted for the proper number of sheets, the operator places a ticket pad under the clamp pins 97 until its rear edge engages the stop flanges 102.

The pushbutton PB is pushed in to cause the carriage to move forward and the roll to impale the pad sheets by the pins 97. The roll will then continue to the forward end of its stroke unless the pushbutton is released to stop the carriage. If the carriage is so stopped it will resume its movements when the pushbutton is depressed again.

At the forward end of the stroke the cam arm 81a will strike the abutment bolt 82 to raise the roll for the return stroke. At about the same time the reversing switch is operated to take the control away from the pushbutton PB and reverse the motor to return the carriage.

At the home end the fixed cam 85 operates the cam pin 81b to lower the roll again. At about the same time the reversing switch SR is operated to prepare the motor for forward carriage movement. The stop switch cuts out the motor operation ready for another forward stroke under the control of pushbutton PB.

The operator now can lift out the ticket pad and customer's card since the roll is holding the clamp in raised position.

If the throw out cam 90 of FIG. 24 is used it will raise the roll one or more times as required without in any way affecting the normal roll shifting actions at the ends of the out and back strokes.

If there is jamming at any time on the outstroke the carriage is immediately stopped by removing the hand from the pushbutton PB. Then, assuming that the cam lift track of FIG. 24 is not used or that it can be moved out of the way if used, the pull lift rod 92 is pushed down to lift the roll. After the obstruction is cleared the rod 92 is operated to push the roll down again.

It is thus seen that the invention provides an improved, simple imprinting machine of the kind described. The printing is distinct completely across the roll because the adjustment provides for precise positioning of the roll shaft to bring the roll into parallelism with the printed indicia on the platen bed. The roll pressure is positive against solid backing and does not depend on spring pressure for making impressions.

While certain embodiments of the invention have been described for purposes of illustration it is to be understood that there may be various embodiments and modifications within the general scope of the invention.

I claim:

1. An imprinting machine comprising, in combination: a base frame provided with a platen surface for supporting printing elements; a carriage reciprocally movable along said base frame in a fixed linear path: a roll shaft; an impression roll on said roll shaft; a roll supporting frame means carrying said roll and roll shaft and pivoted on said carriage for movement of said roll toward and away from a selected printing position; means on said roll supporting frame means restricting said roll shaft against a position change with respect to said roll frame means in a direction away from printing position; and means on said carriage resiliently restricting movement of said roll shaft with respect to said carriage in a direction toward printing position.

2. An imprinting machine as stated in claim 1 wherein said restricting means on said roll frame means includes a turnable cam member on said shaft and detent means on said roll frame means for adjusting said roll relative to said platen surface.

3. An imprinting machine as stated in claim 1 wherein said means on said carriage resiliently restricting movement of said roll shaft includes an upwardly biased bearing means supporting ends of said roll shaft.

4. In an imprinting machine as stated in claim 1 wherein said roll frame means includes a pair of pivotally mounted side members having elongated slots receiving ends of said roll shaft.

5. In an imprinting machine the combination of: a base frame provided with a platen surface for supporting printing elements; a carriage reciprocally movable along said base frame in a fixed linear path; a roll shaft; an imprinting roll on said roll shaft; a roll frame means carrying said roll and shaft and pivotally mounted on said carriage for movement of said roll toward and away from a selected printing position; means adjustably positioning the roll shaft in fixed relation with respect to said carriage; and means positioning said roll frame means during an imprinting cycle in an operative and inoperative relation to the printing elements, said latter positioning means including a cam member pivoted on the carriage and engaged by the roll frame means; and means on the base frame for alternate engagement with said cam member for changing the position of said roll frame means during an imprinting cycle.

References Cited by the Examiner
UNITED STATES PATENTS

| | | | |
|---|---|---|---|
| 772,632 | 10/1904 | Proctor | 101—269 |
| 1,228,423 | 6/1917 | Ellis | 197—90 |
| 1,421,920 | 7/1922 | DeMinico | 101—274 |
| 1,567,360 | 12/1925 | Dudley et al | 101—285 |
| 1,829,004 | 10/1931 | Howard | 101—407 |
| 1,919,954 | 7/1933 | Kranz | 101—269 X |
| 1,941,667 | 1/1934 | Eley et al | 101—269 X |
| 2,104,863 | 1/1938 | Hueber | 101—274 |
| 2,270,082 | 1/1942 | Pearsall | 101—285 |
| 2,578,771 | 12/1951 | Zint | 197—82 |
| 2,866,409 | 12/1958 | Buttner | 101—282 |
| 2,924,172 | 2/1960 | Buttner | 101—282 |
| 2,945,435 | 7/1960 | Davidson | 101—274 |
| 2,963,967 | 12/1960 | Baker et al | 101—407 |

WILLIAM B. PENN, *Primary Examiner.*